(12) United States Patent
Vélez De Mendizábal Alonso et al.

(10) Patent No.: US 11,319,047 B2
(45) Date of Patent: May 3, 2022

(54) THREE DIMENSIONAL AUXETIC STRUCTURE, MANUFACTURING METHOD AND TOOLING

(71) Applicant: Airbus Operations, S.L., Getafe (ES)

(72) Inventors: Iker Vélez De Mendizábal Alonso, Getafe (ES); Esteban Martino González, Getafe (ES); David Apellaniz De La Fuente, Getafe (ES); Alfonso Parra Rubio, Getafe (ES); Elena Moya Sanz, Getafe (ES)

(73) Assignee: Airbus Operations S.L., Getafe (ES)

( * ) Notice: Subject to any disclaimer, the term of this patent is extended or adjusted under 35 U.S.C. 154(b) by 1050 days.

(21) Appl. No.: 15/957,289

(22) Filed: Apr. 19, 2018

(65) Prior Publication Data
US 2018/0312239 A1    Nov. 1, 2018

(30) Foreign Application Priority Data
Apr. 26, 2017  (EP) ..................................... 17382222

(51) Int. Cl.
*B64D 45/00* (2006.01)
*B64D 33/02* (2006.01)
(Continued)

(52) U.S. Cl.
CPC .............. *B64C 1/12* (2013.01); *A43B 1/0009* (2013.01); *A43B 13/02* (2013.01); *A43B 13/14* (2013.01); *B29C 53/04* (2013.01); *B29D 99/0089* (2013.01); *B31D 3/0207* (2013.01); *B32B 3/12* (2013.01); *B32B 15/01* (2013.01); *B32B 27/08* (2013.01); *B64C 3/26* (2013.01); *B64C 11/20* (2013.01); *B64C 11/26* (2013.01); *F01D 5/147* (2013.01); *F01D 11/00* (2013.01); *F01D 21/14* (2013.01); *B21D 5/16* (2013.01); *B29K 2101/12* (2013.01); *B29K 2995/0002* (2013.01);
(Continued)

(58) Field of Classification Search
CPC ......... B64C 1/12; B64C 3/26; B29D 99/0089; B29K 2995/0094; B29C 53/04; B32B 3/12; F01D 5/147; F01D 21/14
USPC ................................. 428/116, 174, 188, 593
See application file for complete search history.

(56) References Cited

U.S. PATENT DOCUMENTS

2004/0102303 A1    5/2004  Kehrle
2013/0344601 A1*  12/2013  Soman ..................... A61L 27/40
                                                                  435/396
2016/0353825 A1*  12/2016  Bottlang ................ A42B 3/065

FOREIGN PATENT DOCUMENTS

DE            10323367        12/2004

OTHER PUBLICATIONS

Novak "Auxetic Cellular Materials—a Review" Strojniški vestnik—Journal of Mechanical Engineering 62(2016)9, 485-493 (Year: 2016).*

(Continued)

*Primary Examiner* — Tri V Nguyen
(74) *Attorney, Agent, or Firm* — Greer, Burns & Crain, Ltd.

(57) ABSTRACT

A three-dimensional auxetic structure, comprising a plurality of adjoining hollow cells, each hollow cell having cell walls and a transversal cross section of the plurality hollow cells following a two-dimensional auxetic pattern, each cell wall comprising folding lines parallel to a plane containing the auxetic pattern such that peaks and valleys are defined in the cell walls and the cell walls being foldable along the folding lines.

12 Claims, 7 Drawing Sheets

(51) Int. Cl.
| | |
|---|---|
| B33Y 10/00 | (2015.01) |
| B33Y 80/00 | (2015.01) |
| B21D 5/16 | (2006.01) |
| B29K 101/12 | (2006.01) |
| B29L 31/08 | (2006.01) |
| B29L 31/30 | (2006.01) |
| B64C 1/12 | (2006.01) |
| F01D 5/14 | (2006.01) |
| A43B 1/00 | (2006.01) |
| B29D 99/00 | (2010.01) |
| F01D 21/14 | (2006.01) |
| B64C 11/26 | (2006.01) |
| F01D 11/00 | (2006.01) |
| B31D 3/02 | (2006.01) |
| A43B 13/02 | (2022.01) |
| A43B 13/14 | (2006.01) |
| B29C 53/04 | (2006.01) |
| B32B 3/12 | (2006.01) |
| B32B 15/01 | (2006.01) |
| B32B 27/08 | (2006.01) |
| B64C 3/26 | (2006.01) |
| B64C 11/20 | (2006.01) |
| B64C 1/00 | (2006.01) |
| F01D 5/28 | (2006.01) |
| B64C 27/473 | (2006.01) |
| F01D 21/04 | (2006.01) |

(52) U.S. Cl.
CPC ........ B29K 2995/0091 (2013.01); B29K 2995/0094 (2013.01); B29L 2031/082 (2013.01); B29L 2031/3082 (2013.01); B32B 2250/03 (2013.01); B32B 2250/40 (2013.01); B32B 2605/18 (2013.01); B33Y 10/00 (2014.12); B33Y 80/00 (2014.12); B64C 2001/0072 (2013.01); B64C 2027/4736 (2013.01); B64D 2033/022 (2013.01); B64D 2045/009 (2013.01); F01D 5/282 (2013.01); F01D 21/045 (2013.01); F05D 2220/36 (2013.01); F05D 2230/54 (2013.01); F05D 2250/131 (2013.01); F05D 2250/132 (2013.01); F05D 2250/182 (2013.01); F05D 2250/183 (2013.01); F05D 2250/283 (2013.01)

(56) References Cited

OTHER PUBLICATIONS

European Search Report, dated Oct. 20, 2017, priority document.
"Three-Dimensional Polymer Constructs Exhibiting a Tunable Negative Poisson's Ratio", David Y Fozdar et al., Jul. 22, 2011.
"Zigzag-base folded sheet cellular mechanical metamaterials", Maryam Eidini, Mar. 1, 2016.

* cited by examiner

THREE DIMENSIONAL AUXETIC STRUCTURE, MANUFACTURING METHOD AND TOOLING

CROSS-REFERENCES TO RELATED APPLICATIONS

This application claims the benefit of the European patent application No. 17382222.2 filed on Apr. 26, 2017, the entire disclosures of which are incorporated herein by way of reference.

FIELD OF THE INVENTION

The present invention is related to a three-dimensional auxetic structure that can be made from a sheet material or by 3D printing. Specifically, it refers to a cellular material for a sandwich panel used in aircraft construction, shipbuilding, and other branches of industry and its associated manufacturing method and mold.

BACKGROUND OF THE INVENTION

Conventional materials found in nature have positive Poisson ratio, they get thinner when stretched and fatter when compressed, following the Poisson ratio equation:

$$v_{yx} = -\frac{\text{transverse strain}}{\text{axial strain}} = -\frac{\varepsilon_x}{\varepsilon_y}$$

Accordingly, Poisson's ratio is defined as the negative of the transverse strain divided by the longitudinal strain.

There are materials or structure geometries configurations that exhibit opposite behavior, that are called auxetic, having a negative Poisson ratio and when stretched, they become thicker perpendicular to the applied force, and thinner when compressed. Therefore, applying a unidirectional tensile force to auxetic material results in an increase in size in the transverse dimension. The behavior of the configuration under impact, which is equivalent to a compression, is that it concentrates material around the impact area due to the negative poisson nature of these configurations.

There are also known two-dimensional auxetic structures having a cell arrangement comprising a plurality of adjoining cells being shaped as inverted hexagons that present an auxetic behavior in the two in-plane directions of the cell's geometry.

Cellular solids are used in a variety of engineering applications and conventional honeycomb hollow cell sandwich structures have become widely used for their strength and lightness. The geometries of conventional cellular structures have been used as cores in sandwich panels within, for example, the aerospace and marine industry.

SUMMARY OF THE INVENTION

The purpose of this invention is to provide a three-dimensional structure with a three-dimensional auxetic behavior to be used as an elementary structure in a three-dimensional tessellation.

The structure object of the invention is a three-dimensional auxetic structure, comprising a plurality of adjoining hollow cells, each hollow cell having cell walls and the transversal cross section of the plurality hollow cells following a two-dimensional auxetic pattern wherein each cell wall comprises folding lines parallel to the plane containing the auxetic pattern such that peaks and valleys are defined in the cell walls and with the cell walls foldable along the folding lines.

The structure is therefore a mixture of a conventional auxetic two-dimensional pattern, for instance inverted hexagons, with kinked walls having folding lines. The structure can be manufactured by 3D printing or by appropriately folding a sheet of material.

As previously stated, the invention can be achieved by means of a flat continuous sheet material to which an specific folding pattern is applied, a so-called origami map. This folding pattern provides both the cell construction and the three-dimensional auxetic behavior of the cell structure. Therefore, the claimed structure behaves as auxetic in the three directions of the space, independently of the direction in which the force is applied. The claimed geometry shows a kinematic behavior of one degree of freedom.

This behavior is highly interesting because this structure can be used as a shape changing morphing structure. Just by controlling one of its characteristic distances, the movement of the full tessellation is controlled and predicted.

Unlike the conventional or re-entrant bidimensional hexagonal, this structure has the characteristic of reducing its dimension or condensate on the other two directions when it is compressed on the direction of the hollows. The condensation capability can be controlled by the angle of the re-entrant cells in combination with the angle of the kinked walls.

It is also an object of the present invention to provide a sandwich panel that comprises a core structure having a three-dimensional auxetic cell configuration according to the previously described one, located between and upper and a lower skin. Such cell geometry can be integrated as the core structure of a composite sandwich panel embedded between CFRP, GFRP, AFRP fabric or metallic skins.

The sandwich panel having an auxetic behavior on the three directions of space can be used as an elementary part for lightweight composite parts with potential applications that require high impact energy absorption, acoustic damping, load carrying structures or morphing structures.

The claimed auxetic structure is able to be folded and unfolded from a continuous flat pattern. This characteristic allows the structure to be manufactured from flat preforms, for example, conventional fabrics or prepregs, or even with thin metal sheets. Additionally, these preforms could be combined with other materials, such as ceramics, in order to achieve multifunctional structures (impacts, structure, acoustic damping . . . ).

The manufacturing method comprises the following steps:

providing a sheet of material, performing on the sheet of material a set of straight parallel folding lines in one direction for forming the walls of the cells, performing kinked folding lines in a perpendicular direction to the straight folding lines, such that at each intersection with the straight folding lines, the kinked lines are kinked with an opposite angle with respect to the straight folding line, the straight and the kinked folding lines being configured such that the straight folding lines define the perimeter of the auxetic cell pattern when the sheet is folded by the kinked lines, folding the sheet of material along the folding lines for obtaining at least a part of the three-dimensional auxetic structure, curing the structure, if the sheet material is a plastic composite sheet.

In order to achieve such structure, a specific tooling is developed, which performs the different foldings for each wall cell and keeps them in their position, which is especially advantageous for composite materials based cells, for which typically a resin curing or injection process is later required and performed.

The tooling comprises a plurality of panels having kinked walls for accommodating a sheet of composite material in-between, the kinked panels defining at least part of a hollow cell, the transversal cross section of the hollow cell following a two-dimensional auxetic pattern, the kinked panels comprising folding lines parallel to the plane containing the auxetic pattern such that peaks and valleys are defined in the cell panels.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
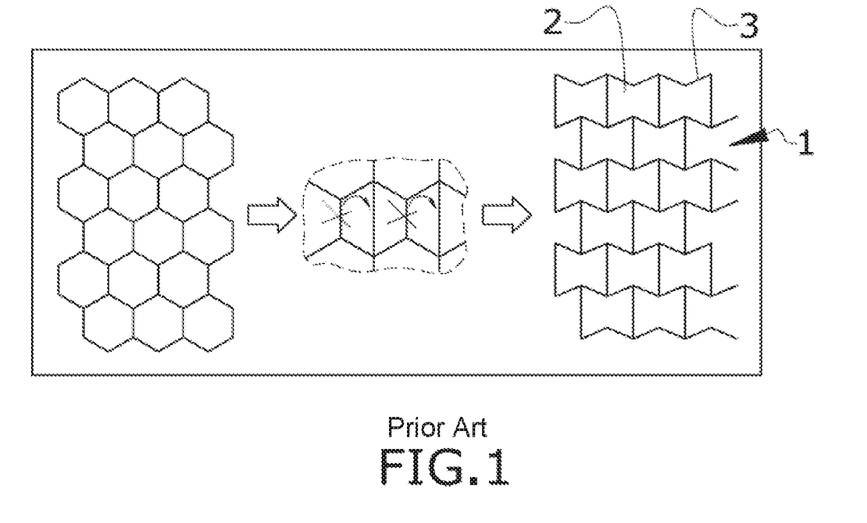
FIG. 1 shows an embodiment of a two-dimensional conventional honeycomb configuration and a two-dimensional modified auxetic honeycomb configuration known in the state of the art.

FIG. 1 shows a known embodiment of a two-dimensional auxetic pattern (1) in which each cell (2) is angled in the form of a polygon having a plurality of edges and vertices, more specifically, a re-entrant hexagonal auxetic cell (2). Each cell (2) defines an internal air-filled cavity.

Figure 3:
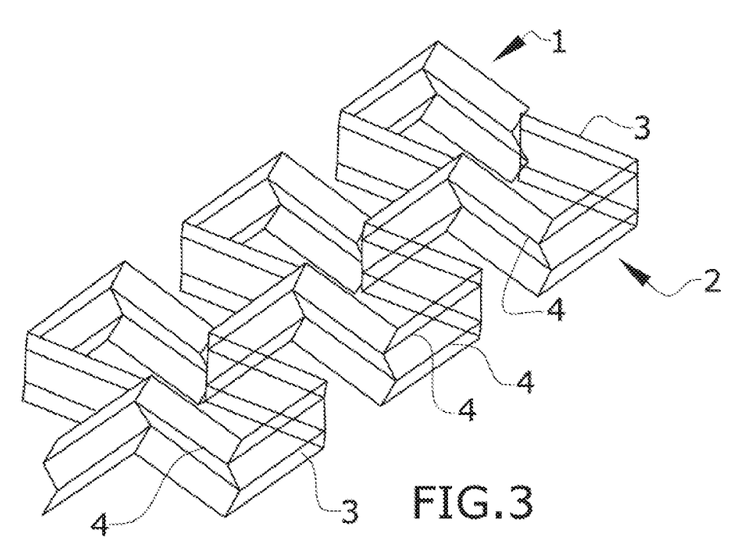
FIG. 3 shows a perspective view of an embodiment of the three-dimensional hollow cell arrangement corresponding to the object of the invention.

Considering FIG. 3, the XY plane can be taken as the plane comprising the auxetic pattern (1) formed by cell walls (3) extending in a direction normal to the XY plane, the structure has an auxetic behavior on three dimensions. When the structure is contracted in one of the directions, X, Y or Z it contracts also on the other two directions, and when it is expanded in one direction X, Y or Z it expands also on the other two directions.

The shown structure comprises a plurality of adjoining hollow cells (2), each hollow cell (2) having cell walls (3). The transversal cross section of the plurality hollow cells (2) follows a two-dimensional auxetic pattern (1) as shown in FIG. 1. Each cell wall (3) comprises folding lines (4) parallel to the plane containing the auxetic pattern (1) such that peaks and valleys are defined in the cell walls (3). The cell walls (3) are foldable along the folding lines (4) and therefore can be extended and compressed in the hollow direction of the cells (2).

Figure 2:
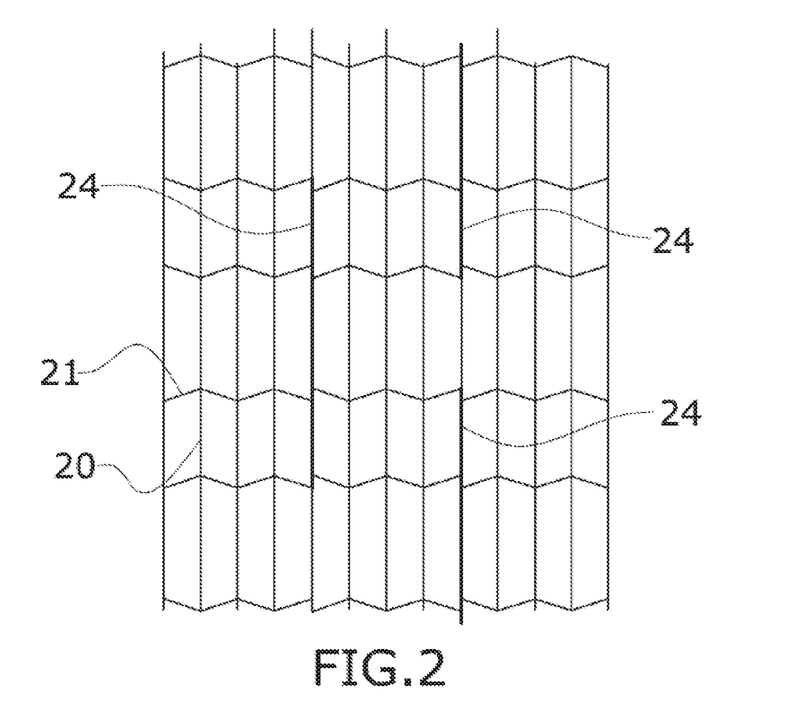
FIG. 2 shows an embodiment of an embodiment of a foldable sheet material.

The claimed structure can be made by 3D printing using a thermoplastic or melting material or, as depicted in FIG. 2, it can be made from a sheet material, comprising zigzagging folding lines defining the cell walls (3) to obtain the desired configuration in order to achieve a three-dimension directions auxetic behavior from a continuous layer of, for instance, prepreg plies.

Figure 5:
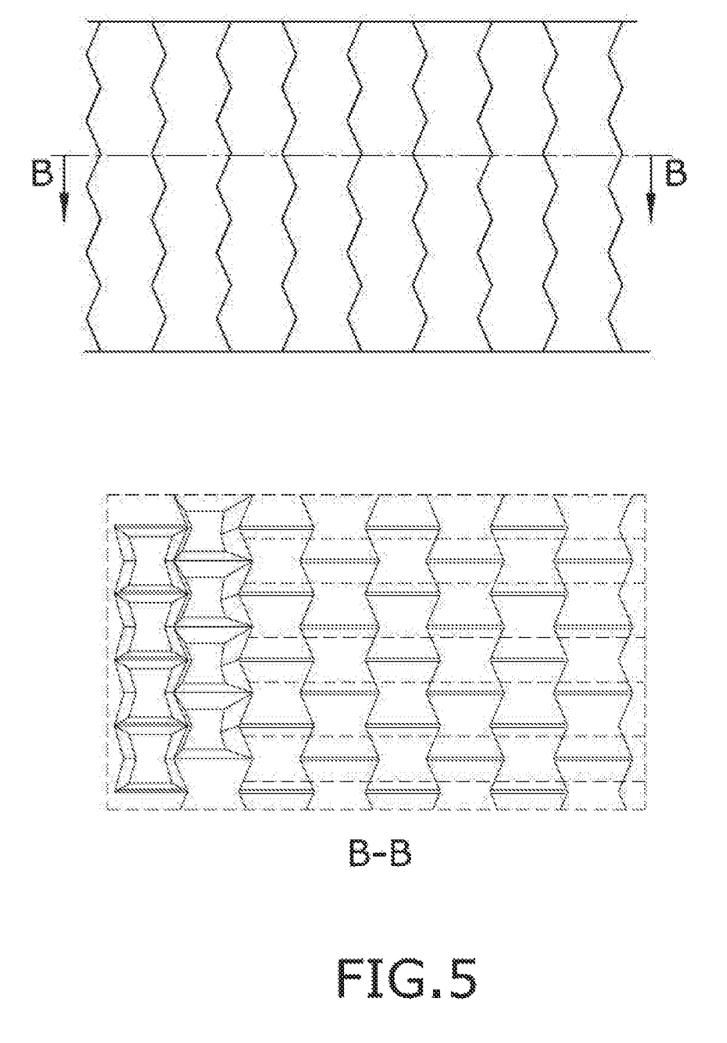
FIG. 5 shows a sectional view of a sandwich panel comprising a second embodiment having a three-dimensional auxetic structure according to the invention in which the structure is located with the hollow direction of the cells perpendicular to the upper and lower sandwich panels.

FIG. 5 discloses a sectional view of a sandwich panel comprising a first embodiment having a three-dimensional auxetic core structure according to an embodiment of the invention in which the structure is located with the hollow direction of the cells (2) perpendicular to the upper and lower sandwich panels (10). When these sandwich panels are subjected to compression forces normal to the panels (10), the sandwich core tends to contract on the other two directions, generating a condensation of material on the impact point. This condensation of material provides additional capability to resist impact and penetration normal to the sandwich panel (10).

Another advantage of this core is that the failure of the cell walls (3) is more progressive and transmits deformation to a larger part of the surrounding structure, so the cell walls are able to absorb more energy than the case when the cell walls (3) are not folded. On the conventional core without folded cell walls (3), they are rigid when they are stable but they become very soft and fail very fast when they start to buckle in compression without being able to deform the surrounding structure.

One additional advantage of this core configuration is that when the distance between the panels (10) is not constant, this configuration is able to adapt to the variations of thickness or shape, as it is the case, for example, on an aerodynamic profile. In a conventional honeycomb core, it is necessary to perform machining in order to adapt to non-uniform sandwich thickness shapes.

Figure 4:
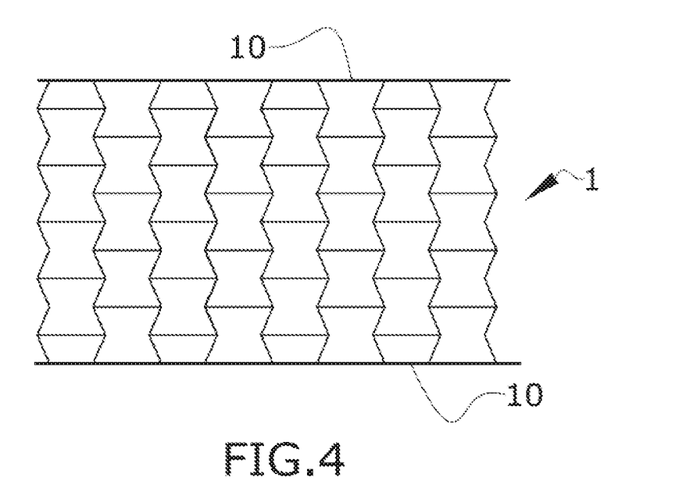
FIG. 4 shows a sectional view of a sandwich panel comprising a first embodiment having a three-dimensional auxetic structure according to the invention in which the structure is located with the hollow direction of the cells parallel to the upper and lower sandwich panels.

FIG. 4 discloses a sectional view of a sandwich panel comprising a second embodiment having a three-dimensional auxetic structure according to an embodiment of the invention in which the structure is located with the hollow direction of the cells (2) parallel to the upper and lower sandwich panels (10). This embodiment provides the additional advantage of not generating closed cells in between the sandwich panels allowing a better drainage of possible water ingested by the sandwich core.

Figure 6:
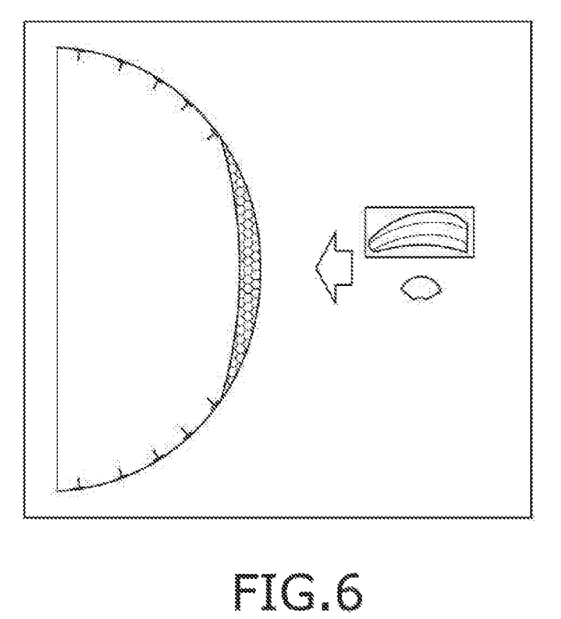
FIG. 6 shows a fuselage cross-section of an aircraft comprising an airframe integrated shield.
Figure 7:
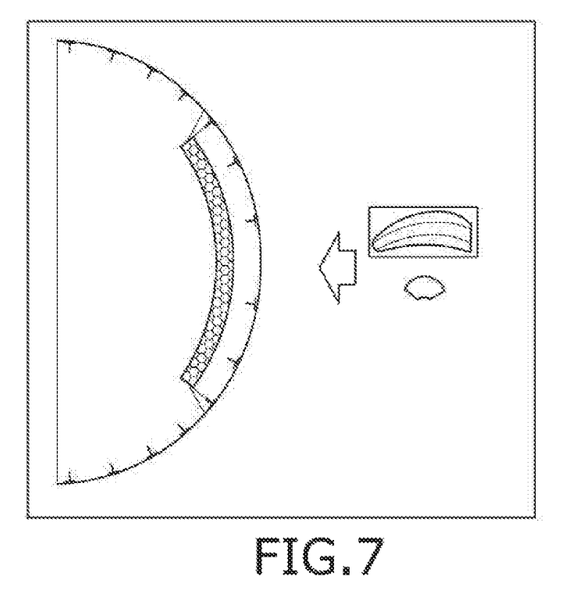
FIG. 7 shows a fuselage cross-section of an aircraft comprising an airframe added shield.
Figure 8:
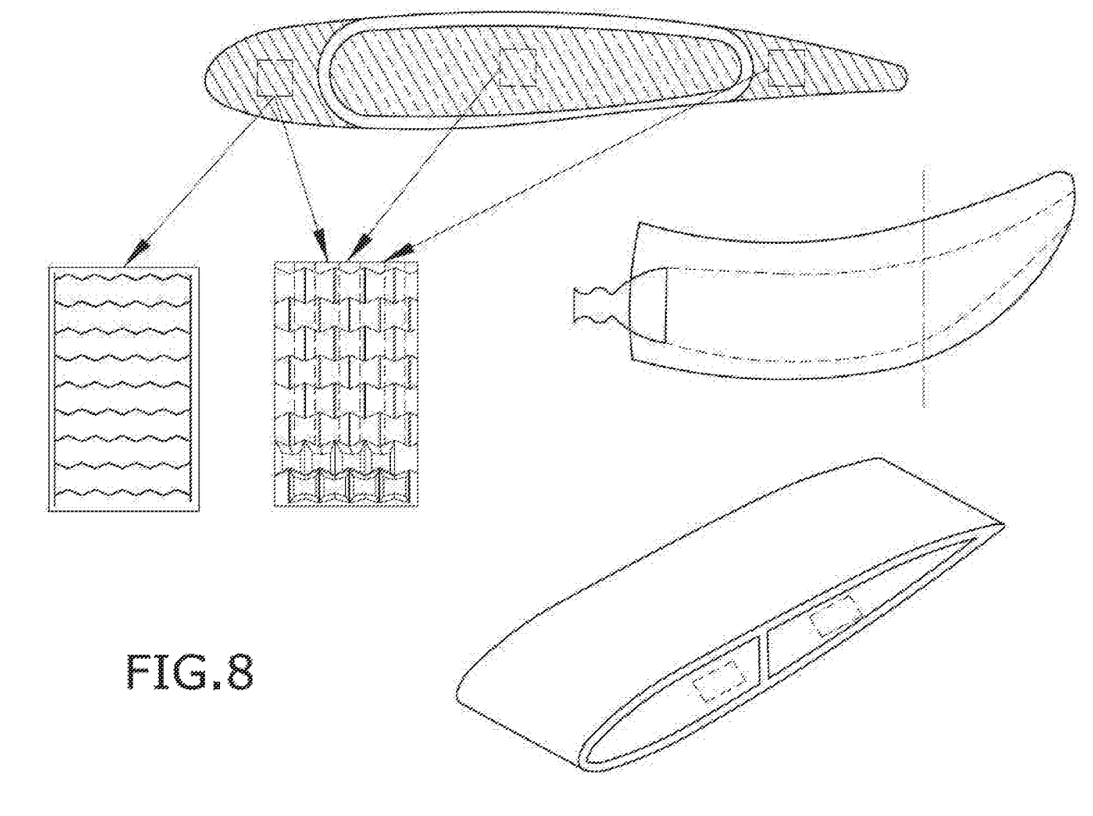
FIG. 8 shows a blade cross-section comprising an auxetic structure according to one embodiment of the invention.

FIGS. 6, 7 and 8 show possible applications to an aircraft:

Fuselage and empennage skins shielding against engine debris and other impact threats.

Lifting surface LE shielding against bird and other impact threats.

Sandwich can be just a panel surrounding the perimeter of aero dynamic profile or can cover the full cavity of the profile section or part of the profile section (LE, box or TE). The proposed core is able to adapt to thickness variations of the sandwich due to the profile non-contact thickness.

Propeller and Turbofan engine blades.

FIGS. 2 and 9 to 11 show an embodiment for the method for manufacturing a three-dimensional auxetic structure from a sheet material.

The sheet material is the one disclosed in FIG. 2 having straight folding lines (20) in one direction for forming the walls of the cells (2) and kinked folding lines (21) in perpendicular direction to the straight folding lines (20), the folding lines (20, 21) defining the edges of the perimeter of the auxetic cell (2) pattern when folded.

Figure 9:
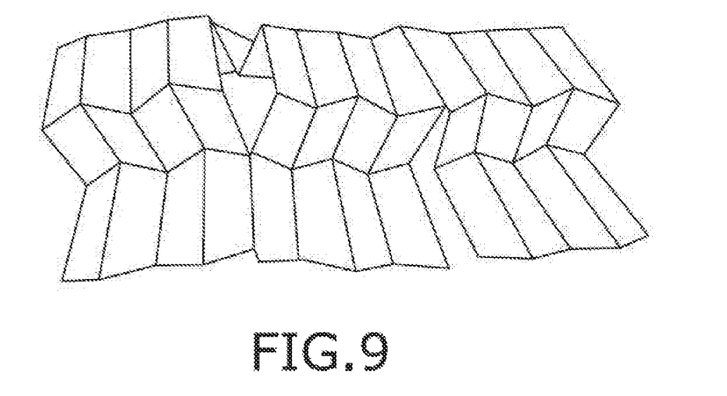
FIGS. 9 to 11 shows the process of cut and folding of the sheet of FIG. 2.
Figure 10:
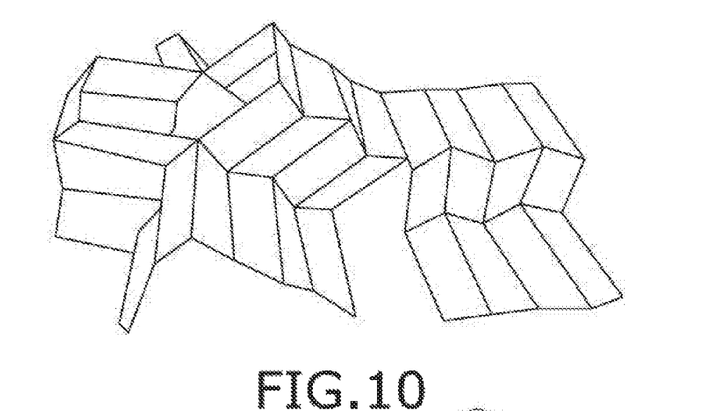

More specifically, FIGS. 2 and 9 to 10 show a pattern having a re-entrant hexagonal auxetic cell (2) from which a complete cell (2) and an omega (22), being the omega (22) half of a hexagonal cell (2), are formed by folding and cutting the sheet.

Figure 11:
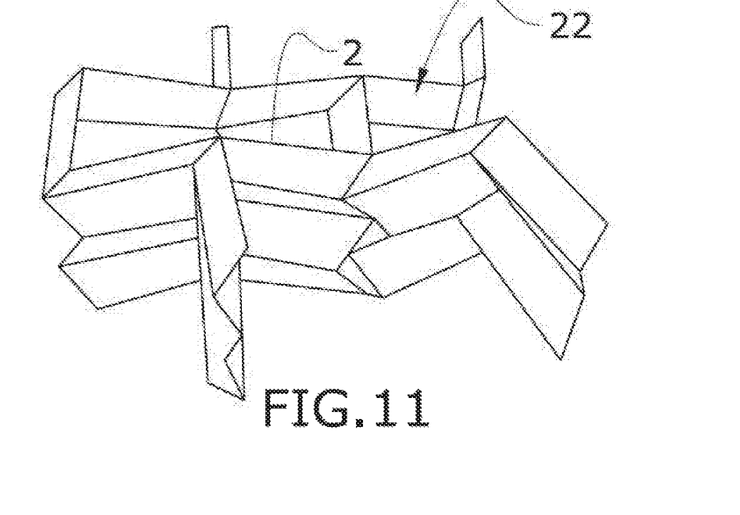

In the specific embodiment of FIGS. 9 and 11, each of the walls (3) comprises three different folding lines and it is able to make up an omega (22) of the pattern. The sheet is cut along a fourth straight line (24) along the sections of the U-shape of the omega in first instance and along the eighth straight line along the sections different from the bottom section of the U-shape.

The number of folded straight lines (4) in between the straight lines (24) containing the cut, can be a different number than three. This number determines the number of folding lines that comprises the cell walls (3) of the resulting three-dimensional auxetic structure.

As showed on FIG. 2, a particularity of this method is that at the intersection of each straight folding line (20) with the kinked line (21), the kinked lines (21) are kinked in an opposite angle with the straight line (20), except at the intersection with the straight lines (24) containing the cut, where the kinked lines (21) are kinked with the same angle with the straight line (20).

This methodology has the advantage that allows the generation of more than one row of omegas at a time with the same sheet to cover a large surface, by increasing the number of folded straight lines (20), instead of just one as described on FIGS. 2, 9 and 11.

As showed in FIG. 11, once formed the omegas and cut, the straight lines (24) containing the cut are turned around so that the upper and lower parts of the U shape of the resulting segments are touching each other and can be joined together by bounding, co-curing or other mechanical joint to form the desired hollow structure ausxetic structure.

An alternative methodology to generate the three-dimensional auxetic structure is to fold several independent sheets to generate each one a row of omegas that are joined by their upper and lower part of the U shapes of the omegas.

Figure 12:
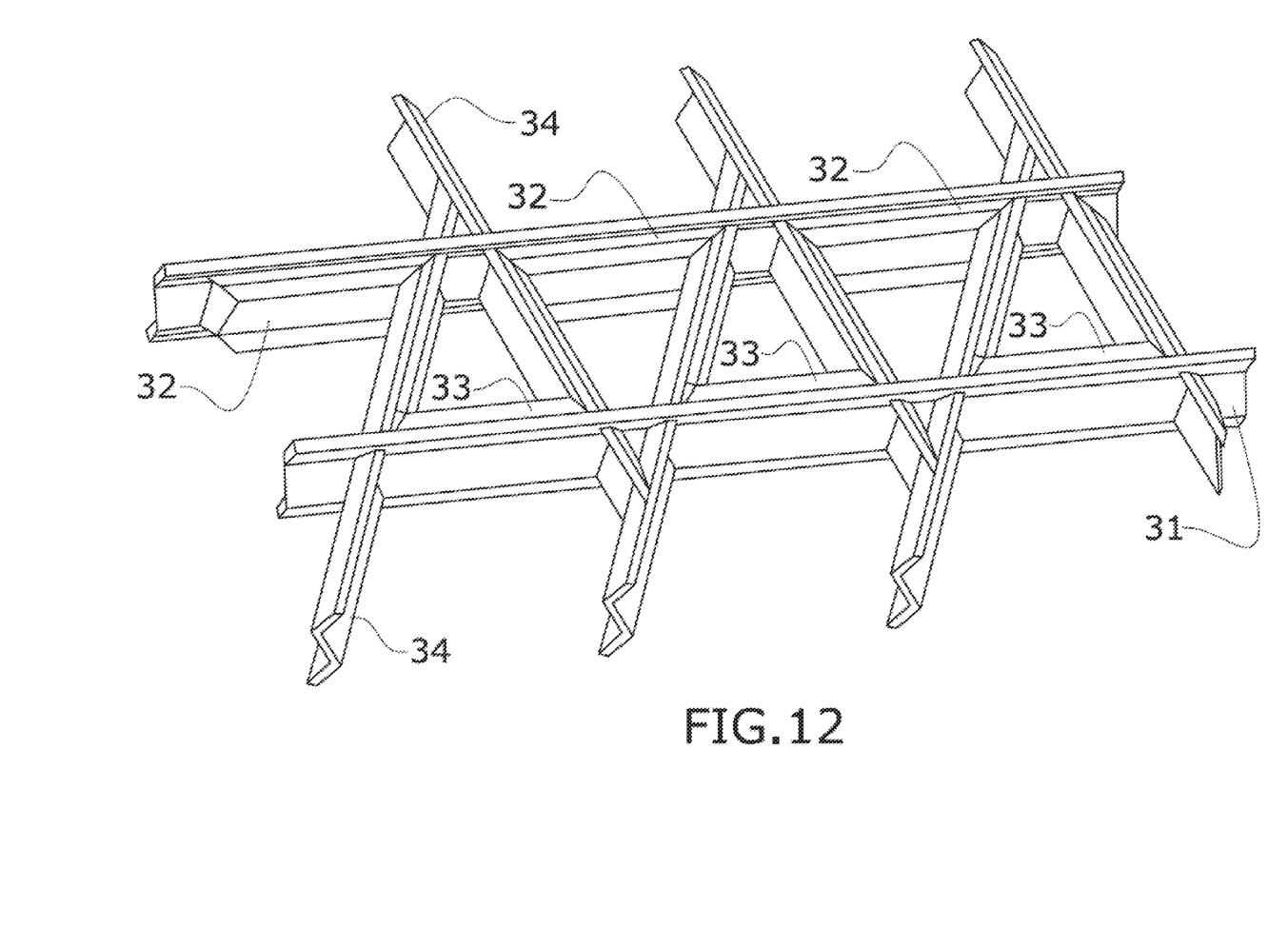
FIG. 12 shows an embodiment of a tooling for manufacturing a three-dimensional auxetic structure.

FIG. 12 discloses an embodiment of the tooling to generate the row of omegas that comprises a rear panel (30) and a front panel (31) having corresponding counter panels (32, 33) and different blades (34) for forming the two legs of the omega shape which alternatively goes through the rear and front panels (30, 31). These blades (34) go through the tooling of the open side of the half-cell until and rest on a counter-panel part that shapes the closed side of the half cell. This is repeated alternatively for each of the half cells of the flat sheet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A three-dimensional auxetic structure, comprising:
a plurality of adjoining hollow cells, each hollow cell having cell walls formed between adjoining hollow cells,
wherein a transversal cross section of the plurality hollow cells form a two-dimensional auxetic pattern,
wherein each cell wall comprises a plurality of folding lines parallel to a plane containing the auxetic pattern such that peaks and valleys are formed between the folding lines in the cell walls and the cell walls are foldable along said folding lines and the hollow cells are compressible in a direction perpendicular to the plane containing the auxetic pattern.

2. The three-dimensional auxetic structure, according to claim 1, wherein the two-dimensional auxetic pattern comprises hollow cells that are angled in the form of a polygon having a plurality of edges and vertices.

3. The three-dimensional auxetic structure, according to claim 2, wherein the polygon is a re-entrant hexagonal auxetic cell.

4. The three-dimensional auxetic structure, according to claim 1, wherein the cell walls are made from a sheet material.

5. The three-dimensional auxetic structure, according to claim 4, wherein the sheet material is a composite preform, a fabric or a unidirectional preform.

6. The three-dimensional auxetic structure, according to claim 5, wherein the composite preform sheet is a prepreg ply.

7. The three-dimensional auxetic structure, according to claim 4, wherein the sheet material is a thin metal sheet preform.

8. The three-dimensional auxetic structure, according to claim 1, wherein the cell walls are made from a thermoplastic material.

9. A sandwich panel comprising a core structure having a three-dimensional auxetic structure according to claim 1, located between an upper and a lower skin.

10. A fuselage of an aircraft comprising the sandwich panel according to claim 9 for absorbing impacts.

11. A lifting surface of an aircraft comprising the sandwich panel according to claim 9 for absorbing impacts.

12. A blade of an engine of an aircraft comprising the sandwich panel according to claim 9 for absorbing impacts.

* * * * *